United States Patent
Kung et al.

(10) Patent No.: US 6,856,814 B2
(45) Date of Patent: Feb. 15, 2005

(54) ELECTRONIC DEVICE INCLUDING SEPARABLE AND INDEPENDENTLY OPERABLE PERSONAL DIGITAL ASSISTANT AND MOBILE COMMUNICATIONS DEVICE

(75) Inventors: Shao-Tsu Kung, Taipei (TW); Chuan-Yuan Lee, Taipei (TW); Lung-Hsud Song, Taipei (TW); Chun-Chung Lai, Taipei (TW)

(73) Assignee: Compal Electronics, INC, Taipei (TW)

( * ) Notice: Subject to any disclaimer, the term of this patent is extended or adjusted under 35 U.S.C. 154(b) by 423 days.

(21) Appl. No.: 10/179,311

(22) Filed: Jun. 26, 2002

(65) Prior Publication Data

US 2004/0203504 A1 Oct. 14, 2004

(51) Int. Cl.$^7$ ................................................. H04B 1/38
(52) U.S. Cl. ................. 455/557; 455/556.1; 455/556.2; 379/433.01
(58) Field of Search ............................... 455/557, 556.1, 455/556.2, 550.1, 575.1, 572, 573; 379/433.01, 433.08, 433.11

(56) References Cited

U.S. PATENT DOCUMENTS 5,625,673 A * 4/1997 Grewe et al. ............. 455/556.2
5,640,689 A * 6/1997 Rossi ....................... 455/575.7
5,974,334 A * 10/1999 Jones, Jr. .................. 455/556.2
6,701,394 B2 * 3/2004 Wang ........................... 710/62

* cited by examiner

Primary Examiner—Lee Nguyen
Assistant Examiner—Minh D Dao
(74) Attorney, Agent, or Firm—Bacon & Thomas PLLC

(57) ABSTRACT

In an electronic device, a mobile communications device includes a housing having a first mounting surface disposed removably on an outer mounting surface of a casing body of a personal digital assistant, a battery pack having a second mounting surface disposed removably on the first mounting surface for supplying electric power to the mobile communications device, and a fastening unit for fastening releasably the battery pack on the housing. A first electrical connector provided on the outer mounting surface is connected electrically and detachably to a second electrical connector provided on the first mounting surface to permit signal transmission between the personal digital assistant and the mobile communications device. An engaging unit is provided on the outer mounting surface and the first mounting surface to permit engagement between the personal digital assistant and the mobile communications device when the first mounting surface is disposed on the outer mounting surface.

13 Claims, 8 Drawing Sheets

US 6,856,814 B2

ELECTRONIC DEVICE INCLUDING SEPARABLE AND INDEPENDENTLY OPERABLE PERSONAL DIGITAL ASSISTANT AND MOBILE COMMUNICATIONS DEVICE

BACKGROUND OF THE INVENTION

1. Field of the Invention

The invention relates to an electronic device, more particularly to an electronic device that includes separable and independently operable personal digital assistant and mobile communications device.

2. Description of the Related Art

Personal digital assistants or pocket personal computers have evolved to become effective tools to manage personal daily transactions due to the conveniences in carrying and data access via the Internet, whereby a personal digital assistant may be coupled to the Internet via a mobile phone connected to a wireless communications network to conduct information transmission.

A conventional integrated product in accordance with the afore said idea can be designed to integrate a circuit functioning as a mobile phone to a personal digital assistant or to add functions of a personal digital assistant to a mobile phone, such as a smart phone. However, the conventional integrated product generally has a relatively large size, thereby resulting in inconvenience when carrying the same. Moreover, the conventional integrated product cannot be split into an independent personal digital assistant or mobile phone such that, no matter which function is needed, the user must carry the integrated product as a whole, thereby resulting in limited flexibility during use.

SUMMARY OF THE INVENTION

Therefore, the object of the present invention is to provide an electronic device that includes separable and independently operable personal digital assistant and mobile communications device.

According to the present invention, an electronic device comprises:

a personal digital assistant including a casing body having an outer mounting surface that is provided with a first electrical connector;

a mobile communications device including a housing having a first mounting surface disposed removably on the outer mounting surface of the casing body, the first mounting surface being provided with a second electrical connector that is connected electrically and detachably to the first electrical connector to permit signal transmission between the personal digital assistant and the mobile communications device, a battery pack having a second mounting surface disposed removably on the first mounting surface of the housing and coupled electrically to the mobile communications device for supplying electric power thereto, and a fastening unit provided on the housing and the battery pack for fastening releasably the battery pack on the housing when the first mounting surface of the housing is removed from the outer mounting surface of the casing body and when the second mounting surface of the battery pack is disposed on the first mounting surface; and an engaging unit provided on the outer mounting surface of the casing body and the first mounting surface of the housing to permit engagement between the personal digital assistant and the mobile communications device when the second mounting surface of the battery pack is removed from the first mounting surface of the housing and when the first mounting surface of the housing is disposed on the outer mounting surface of the casing body.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
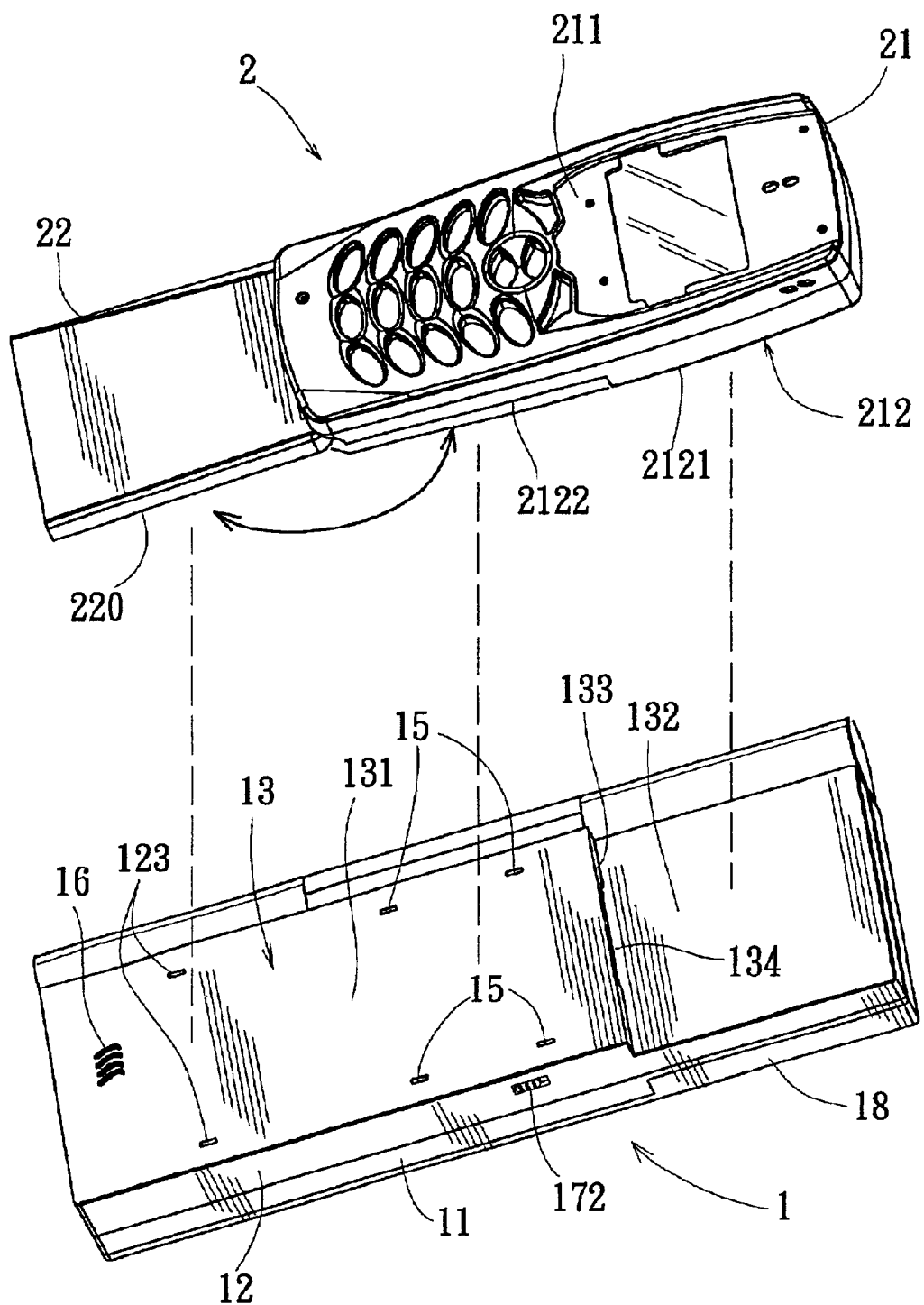
FIG. 1 is an exploded perspective view showing the preferred embodiment of an electronic device according to the present invention.

Referring to FIGS. 1 to 4, the preferred embodiment of an electronic device according to the present invention is shown to include a personal digital assistant 1, a mobile communication device 2, and an engaging unit.

In this embodiment, the personal digital assistant 1 is a hand held personal computer. The personal digital assistant 1 includes a base body 11, and a casing body 12 connected pivotally to the base body 11. The base body 11 has an inner surface provided with a keyboard 11 (see FIG. 4). The casing body 12 has an inner display surface 121, and an outer mounting surface 13 opposite to the inner display surface 120. The outer mounting surface 13 is a stepped surface that has an upper portion 131, a lower portion 132, and an intermediate portion 133 interconnecting and transverse to the upper and lower portions 131, 132. The intermediate portion 133 of the outer mounting surface 13 is provided with a first electrical connector 14 received in a recess 134 formed thereon (see FIG. 2).

Figure 2:
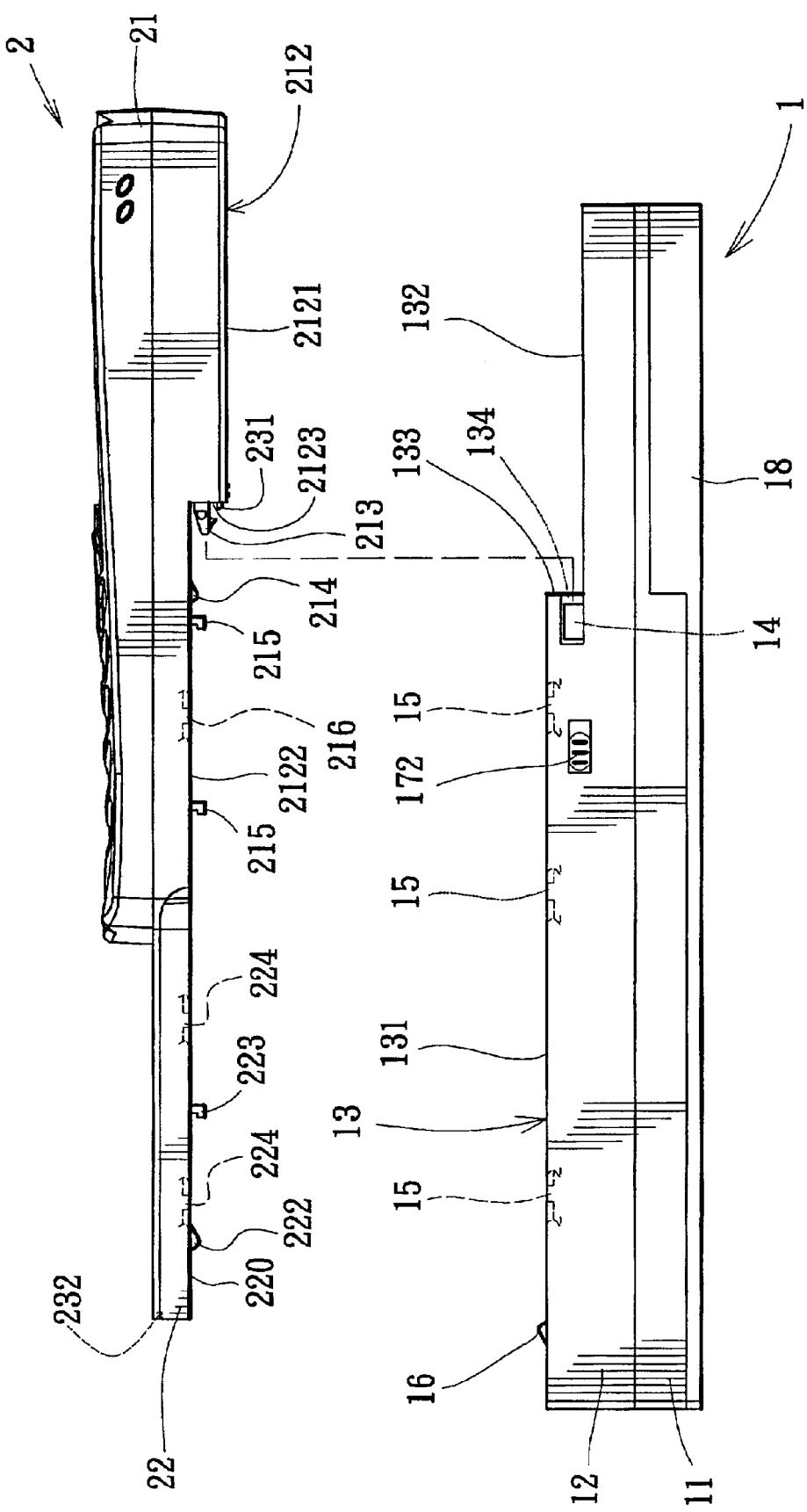
FIG. 2 is a schematic side view of FIG. 1.
Figure 3:
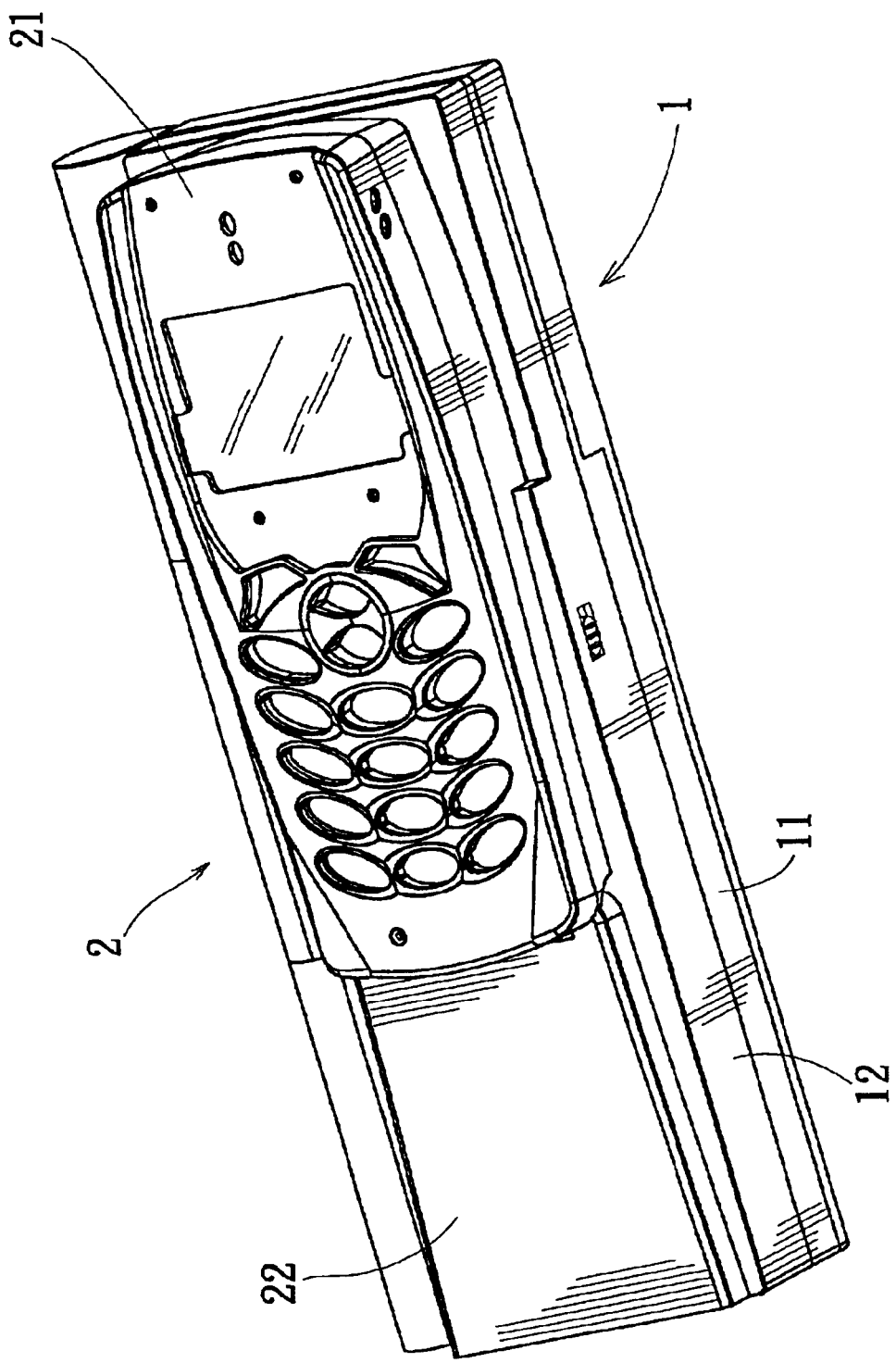
FIG. 3 is a perspective view showing the preferred embodiment.
Figure 4:
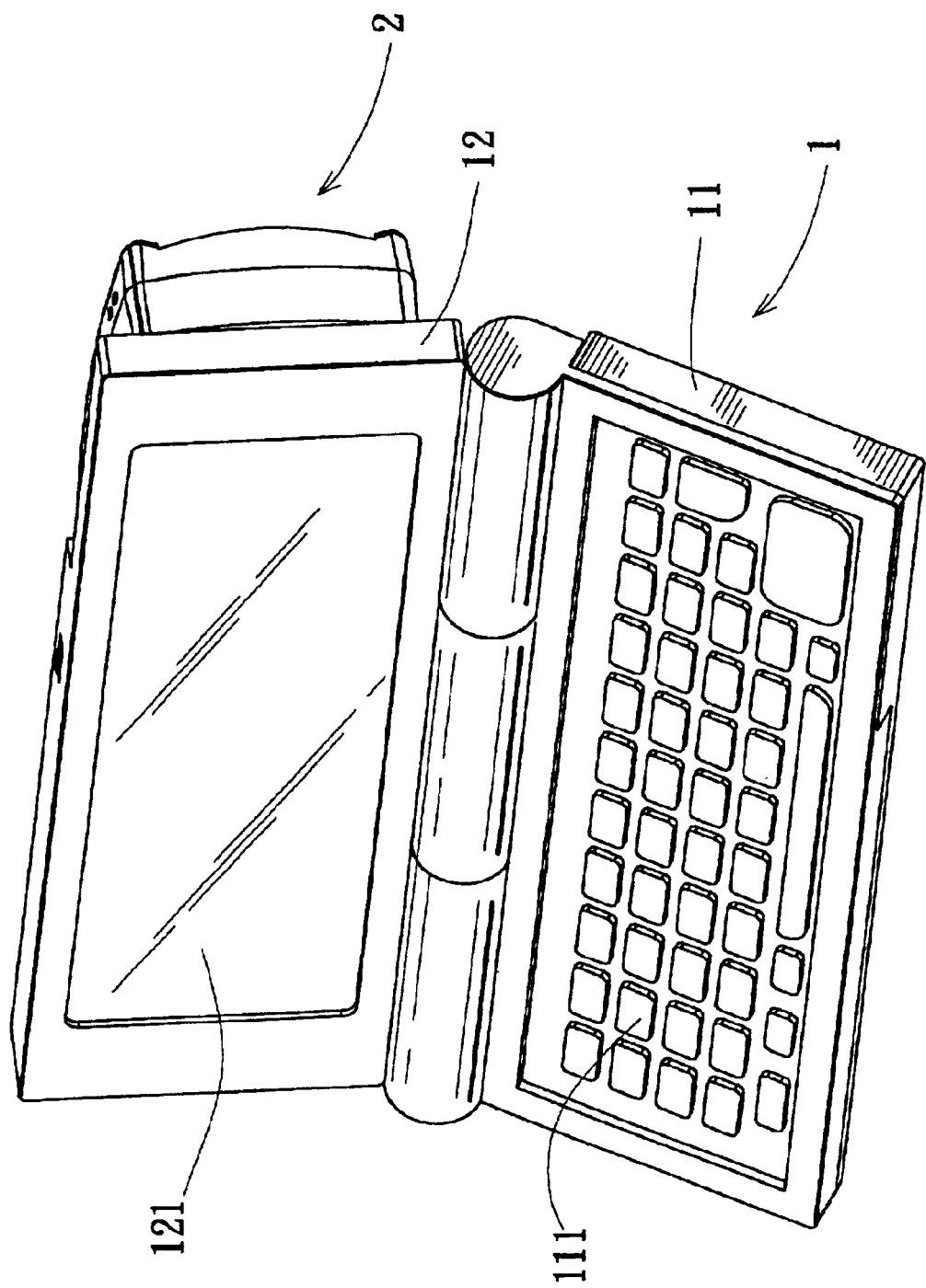
FIG. 4 is a perspective view showing the preferred embodiment in a state of use.
Figure 5:
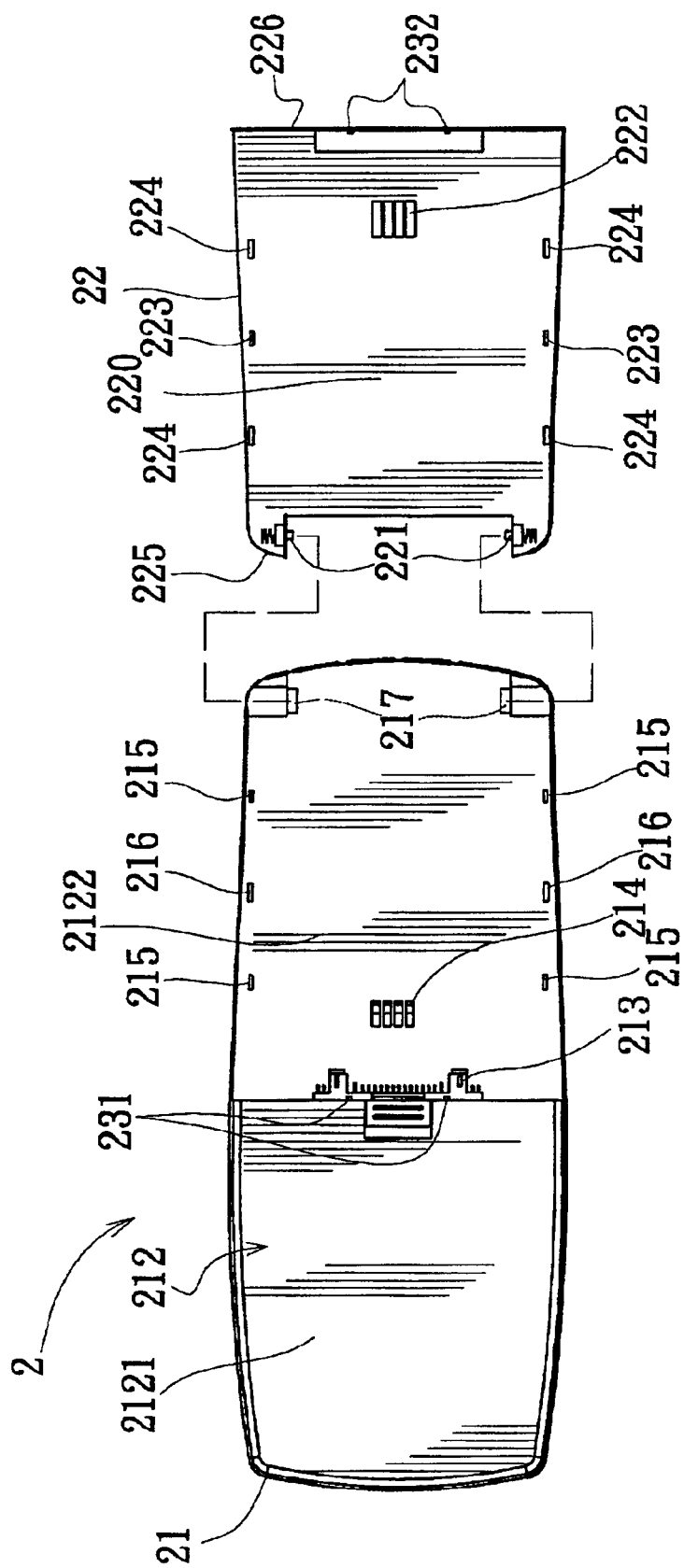
FIG. 5 is an exploded schematic view showing a mobile communications device of the preferred embodiment.
Figure 7:
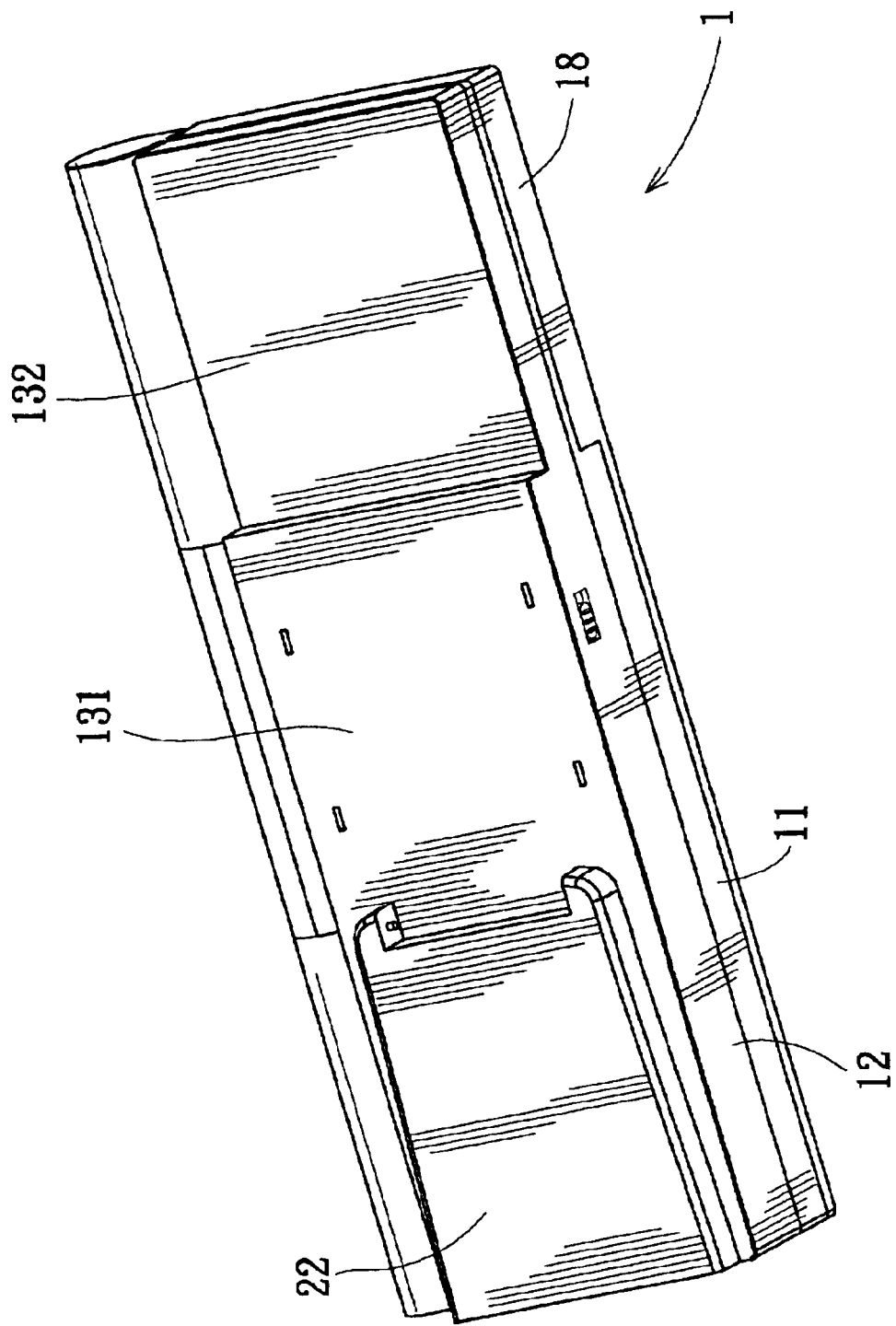
FIG. 7 is a perspective view showing a personal digital assistant of the preferred embodiment in a state of use.

Referring further to FIGS. 2 and 5, the mobile communications device 2, such as a mobile phone, includes a housing 21, a battery pack 22 and a fastening unit. The housing 21 has a first mounting surface 212 disposed removably on the outer mounting surface 13 of the casing body 12. In this embodiment, the first mounting surface 212 is a stepped surface so as to match the outer mounting surface 13 of the casing body 12, and has a first portion 2121, a second portion 2122 and a third portion 2123 interconnecting and transverse to the first and second portions 2121, 2122. The third portion 2123 of the first mounting surface 212 is provided with a second electrical connector 213 that is connected electrically and detachably to the first electrical connector 14 to permit signal transmission between the personal digital assistant 1 and the mobile communications device 2. The battery pack 22 has a second mounting surface 220 disposed removably on the second portion 2122 of the first mounting surface 212 and coupled electrically to the mobile communications device 2 for supplying electric power thereto via electrical connection between a plurality of conductive contacts 222 provided on the second mounting surface 220 of the battery pack 22 and a plurality of conductive terminals 214 provided on the second portion 2122 of the first mounting surface 212 of the housing 21. In this embodiment, the battery pack 22 has a pivot end 225 provided with a pivot unit for connecting pivotably and removably with the housing 21, wherein the pivot unit includes a pair of spring-loaded pivot posts 221 that pivotally and removably engage a pair of pivot holes 217 formed in the housing 21 (see FIG. 5), and a free end 226 opposite to the pivot end 225 and fastened releasably to the housing 21. Furthermore, the battery pack 22 is rechargeable. The upper portion 131 of the outer mounting surface 13 of the casing body 12 is provided with a plurality of conductive terminals 16 to connect electrically with the conductive contacts 222 when the second mounting surface 220 of the battery pack 22 is removed from the first mounting surface 212 of the housing 21 and is disposed on the upper portion 131 of the outer mounting surface 13 of the casing body 12 so as to enable the personal digital assistant 1 to recharge the battery pack 22 (see FIG. 7). The second mounting surface 220 of the battery pack 22 is formed with two engaging hooks 223, and the upper portion 131 of the outer mounting surface 13 is formed with two engaging holes 123 to engage the engaging hooks 223 when the second mounting surface 220 of the battery pack 22 is removed from the first mounting surface 212 of the housing 21 and is disposed on the outer mounting surface 13 of the casing body 12. As such, the second portion 2122 of the first mounting surface 212 is formed with two receiving holes 216 for extension of the engaging hooks 223 on the battery pack 22 when the second mounting surface 220 of the battery pack 22 is disposed on the first mounting surface 212 of the housing 21. The fastening unit is provided on the housing 21 and the battery pack 22 for fastening releasably the battery pack 22 on the housing 21 when the first mounting surface 212 of the housing 21 is removed from the outer mounting surface 131 of the casing body 12 and when the second mounting surface 220 of the battery pack 22 is disposed on the second portion 2122 of the first mounting surface 212 of the housing 21. In this embodiment, the fastening unit includes a pair of operable engaging posts 231 provided on the third portion 2123 of the first mounting surface 212 of the housing 21, and a pair of engaging holes 232 formed in the free end 266 of the battery pack 22.

Figure 6:
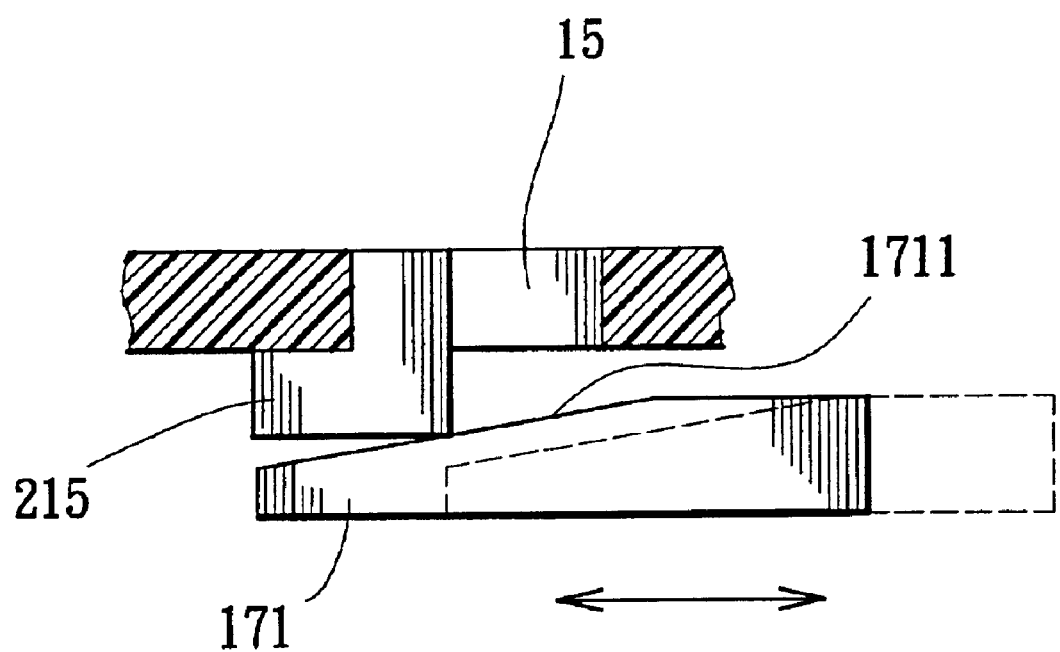
FIG. 6 is a fragmentary schematic view showing an anchoring block of an engaging unit of the preferred embodiment in an anchoring state.

The engaging unit is provided on the outer mounting surface 13 of the casing body 12 and the first mounting surface 212 of the housing 21 to permit engagement between the personal digital assistant 1 and the mobile communications device 2 when the second mounting surface 220 of the battery pack 22 is removed from the first mounting surface 212 of the housing 21 and when the first mounting surface 212 of the housing 21 is disposed on the outer mounting surface 13 of the casing body 12. In this embodiment, the engaging unit includes a plurality of engaging holes 15 formed in the upper portion 131 of the outermounting surface 13 of the casing body 12, and a plurality of engaging hooks 215 formed on the second portion 2122 of the first mounting surface 212 of the housing 21. Each engaging hook 215 extends into and engages a periphery of a respective one of the engaging holes 15 when the housing 21 is mounted on the casing body 12 (see FIGS. 2 and 5). As such, the second mounting surface 220 of the battery pack 22 is formed with a plurality of receiving holes 224 for extension of the engaging hooks 215 on the first mounting surface 212 of the housing 21 when the second mounting surface 220 of the battery pack 22 is disposed on the first mounting surface 212 of the housing 21. As best shown in FIGS. 2 and 6, the engaging unit further includes an anchoring block 171 disposed movably in the casing body 12 and having a bevel face 1711, and an operating portion 172 connected to the anchoring block 171 and mounted movably on the casing body 12. The operating portion 172 is operable between an anchoring state, where the anchoring block 171 is moved to abut the bevel face 1711 against one of the engaging hooks 215 so as to reinforce engagement between said one of the engaging hooks 215 and the periphery of the respective one of the engaging holes 15 (see FIG. 6), and a releasing state, where the anchoring block 171 is moved away from said one of the engaging hooks 215 so as to permit removal of the engaging hooks 215 from the engaging holes 15.

Further, when the mobile communications device 2 is a wireless network transmission module built-in with the Wireless LAN Communications Protocol or Bluetooth Communications Protocol, the personal digital assistant 1 when combined with the mobile communications device 2 can perform wireless communications.

Figure 8:
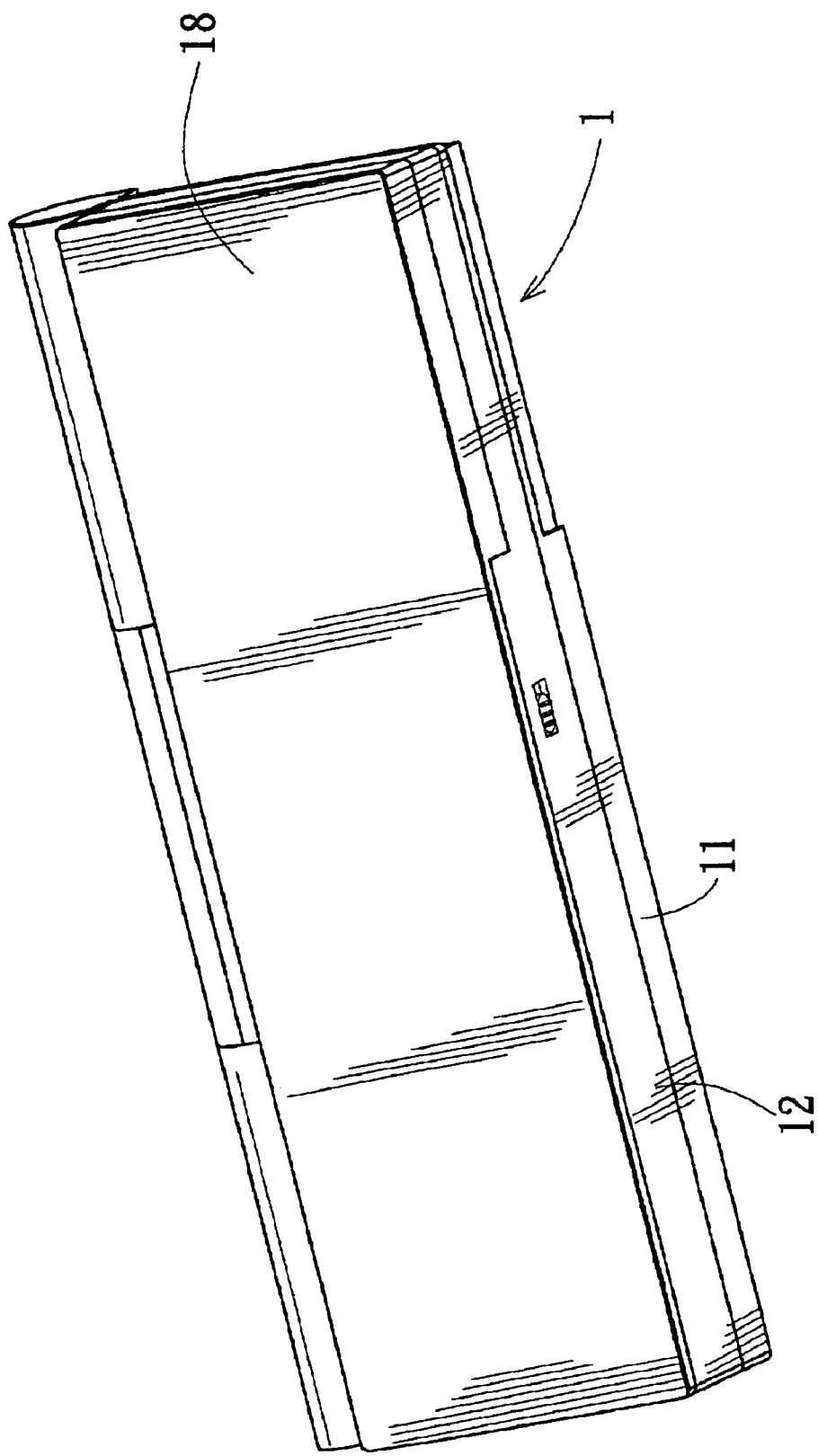
FIG. 8 is a perspective view showing the personal digital assistant of the preferred embodiment in another state of use.

The personal digital assistant 1 further includes a cover body 18 mounted removably on the base body 11 (see FIG. 1) or on the casing body 12 for covering the outer mounting surface 13 of the casing body 12 when the mobile communication device 2 is detached from the casing body 12 (see FIG. 8), thereby resulting in a neat appearance.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An electronic device comprising:
    a personal digital assistant including a casing body having an outer mounting surface that is provided with a first electrical connector;
    a mobile communications device including
        a housing having a first mounting surface disposed removably on said outer mounting surface of said casing body, said first mounting surface being provided with a second electrical connector that is connected electrically and detachably to said first electrical connector to permit signal transmission between said personal digital assistant and said mobile communications device,
        a battery pack having a second mounting surface disposed removably on said first mounting surface of said housing and coupled electrically to said mobile communications device for supplying electric power thereto, and
        a fastening unit provided on said housing and said battery pack for fastening releasably said battery pack on said housing when said first mounting surface of said housing is removed from said outer mounting surface of said casing body and when said second mounting surface of said battery pack is disposed on said first mounting surface; and
    an engaging unit provided on said outer mounting surface of said casing body and said first mounting surface of said housing to permit engagement between said personal digital assistant and said mobile communications device when said second mounting surface of said battery pack is removed from said first mounting surface of said housing and when said first mounting surface of said housing is disposed on said outer mounting surface of said casing body.

2. The electronic device as claimed in claim 1, wherein said battery pack has a pivot end provided with a pivot unit for connecting pivotably and removably with said housing.

3. The electronic device as claimed in claim 2, wherein said battery pack further has a free end opposite to said pivot end and fastened releasably to said housing.

4. The electronic device as claimed in claim 1, wherein said battery pack is rechargeable, said second mounting surface of said battery pack being provided with a plurality of conductive contacts, said outer mounting surface of said casing body being provided with a plurality of conductive terminals to connect electrically with said conductive contacts when said second mounting surface of said battery pack is removed from said first mounting surface of said housing and is disposed on said outer mounting surface of said casing body so as to enable said personal digital assistant to recharge said battery pack.

5. The electronic device as claimed in claim 4, wherein said second mounting surface of said battery pack is formed with an engaging hook, and said outer mounting surface of said casing body is formed with an engaging hole to engage said engaging hook when said second mounting surface of said battery pack is removed from said first mounting surface of said housing and is disposed on said outer mounting surface of said casing body.

6. The electronic device as claimed in claim 5, wherein said first mounting surface of said housing is formed with a receiving hole for extension of said engaging hook on said battery pack when said second mounting surface of said battery pack is disposed on said first mounting surface.

7. The electronic device as claimed in claim 1, wherein said personal digital assistant further includes a cover body mounted removably on said casing body for covering said outer mounting surface when said mobile communication device is detached from said casing body.

8. The electronic device as claimed in claim 1, wherein said engaging unit includes an engaging hole formed in said outer mounting surface of said casing body, and an engaging hook formed on said first mounting surface of said housing, said engaging hook extending into and engaging a periphery of said engaging hole when said housing is mounted on said casing body.

9. The electronic device as claimed in claim 8, wherein said engaging unit further includes an anchoring block disposed movably in said casing body and having a bevel face, and an operating portion connected to said anchoring block and mounted movably on said casing body, said operating portion being operable between an anchoring state, where said anchoring block is moved to abut said bevel face against said engaging hook so as to reinforce engagement between said engaging hook and the periphery of said engaging hole, and a releasing state, where said anchoring block is moved away from said engaging block so as to permit removal of said engaging hook from said engaging hole.

10. The electronic device as claimed in claim 8, wherein said second mounting surface of said battery pack is formed with a receiving hole for extension of said engaging hook on said housing when said second mounting surface of said battery pack is disposed on said first mounting surface.

11. The electronic device as claimed in claim 1, wherein said personal digital assistant includes a handheld personal computer.

12. The electronic device as claimed in claim 1, wherein said mobile communications device includes a mobile telephone.

13. The electronic device as claimed in claim 1, wherein said mobile communications device includes a wireless network transmission module.

* * * * *